US006623813B2

United States Patent
Hsu

(10) Patent No.: US 6,623,813 B2
(45) Date of Patent: Sep. 23, 2003

(54) HOLLOW ARTIFICIAL STONE WITH FABRICATING METHOD THEREOF

(76) Inventor: Angela Hsu, 8F-4, No. 4, Lane 226, Jen-Ai Road, Lin Kou Hsiang, Taipei Hsien (TW)

(*) Notice: Subject to any disclaimer, the term of this patent is extended or adjusted under 35 U.S.C. 154(b) by 8 days.

(21) Appl. No.: 09/788,381

(22) Filed: Feb. 21, 2001

(65) Prior Publication Data

US 2002/0106487 A1 Aug. 8, 2002

(30) Foreign Application Priority Data

Feb. 2, 2001 (TW) .......................................... 90102180 A

(51) Int. Cl.$^7$ ................................................ A01N 1/00
(52) U.S. Cl. ........................ 428/15; 428/323; 428/327; 428/402; 264/46.6
(58) Field of Search ........................ 428/15, 327, 402, 428/323, 161; 264/46.6, 69, 271.1, 289; 52/309.1

(56) References Cited

U.S. PATENT DOCUMENTS 5,443,774 A * 8/1995 Kluh et al. .................. 264/130
6,060,006 A * 5/2000 Savenok ..................... 264/45.7
6,309,562 B1 * 10/2001 Sakia et al. ............. 252/301.36

* cited by examiner

*Primary Examiner*—Deborah Jones
*Assistant Examiner*—Abraham Bahta
(74) *Attorney, Agent, or Firm*—Troxell Law Office PLLC

(57) ABSTRACT

A hollow artificial stone structure includes a mixed material of stone powder and adhesive, molded by a tool having an inner wall with the same shape as a contour of the finished work piece, and a hollow blank having the almost same shape as the molding tool with a size smaller than the molding tool. The hollow blank is placed into a mold room in the molding tool such that a clearance is formed between the inner wall and the bush blank. The mixed material is poured into the clearance so as to fill with the clearance and then solidified as a firm shape with the hollow blank. The molding tool is separated to obtain the hollow artificial stone with a thickness of the clearance and the hollow blank.

4 Claims, 5 Drawing Sheets

HOLLOW ARTIFICIAL STONE WITH FABRICATING METHOD THEREOF

BACKGROUND OF THE INVENTION

1. Field of the Invention

The present invention relates to a hollow artificial stone with a fabricating method for the hollow artificial stone.

2. Description of the Prior Art

The artificial stone has been very popularly used in recent years. The method to fabricate the artificial stone is to prepare the stone powder by thoroughly mixing with an adhesive. Then, the mixture forms a specific configuration after solidification. The artificial stone provides the same hardness as the stone, in addition to the powered bond of high molecular adhesive. A sense of quality, which is owned by the natural stone, can also be kept on the artificial stone after solidification.

The artificial stone is formed by way of pouring and squeezing the mixed material so that a shape such as a slate or a post can be obtained. Although the artificial solid stone may not take the place of natural solid stone, natural solid stone is too heavy or costly for a hollow material.

A hollow article such as a pipe, a lamp stand, or the like is frequently used in practice. For instance, it can be understood that the lamp stand for a table lamp, especially for a luxury table lamp, emphasizes the material thereof and it has been made of ceramics, glass, or plastics with a hollow shape before. But, the preceding materials have their own defects respectively while they are utilized as the material for lamp stand, such materials as ceramics are not penetrable for light, the glass being apt to be broken, and the plastics being much too light without a sense of being valuable. These materials provide no sense of quality owned by the natural material so that they are not so welcomed by consumers, especially, since the consciousness of environmental protection is rising. Besides, the materials for pipes and hollow posts have the same situation as well.

SUMMARY OF THE INVENTION

An object of the present invention is to provide a method for fabricating a hollow artificial stone structure, which offers an easy way for making the hollow artificial stone.

Another object of the present invention is to provide a method for fabricating a hollow artificial stone structure, which is possible to make the hollow artificial stone structure having a sense of quality owned by natural stone.

A further object of the present invention is to provide a hollow artificial stone, which is lighter for delivery and assembling.

DETAILED DESCRIPTION OF THE PREFERRED EMBODIMENTS

Figure 1:
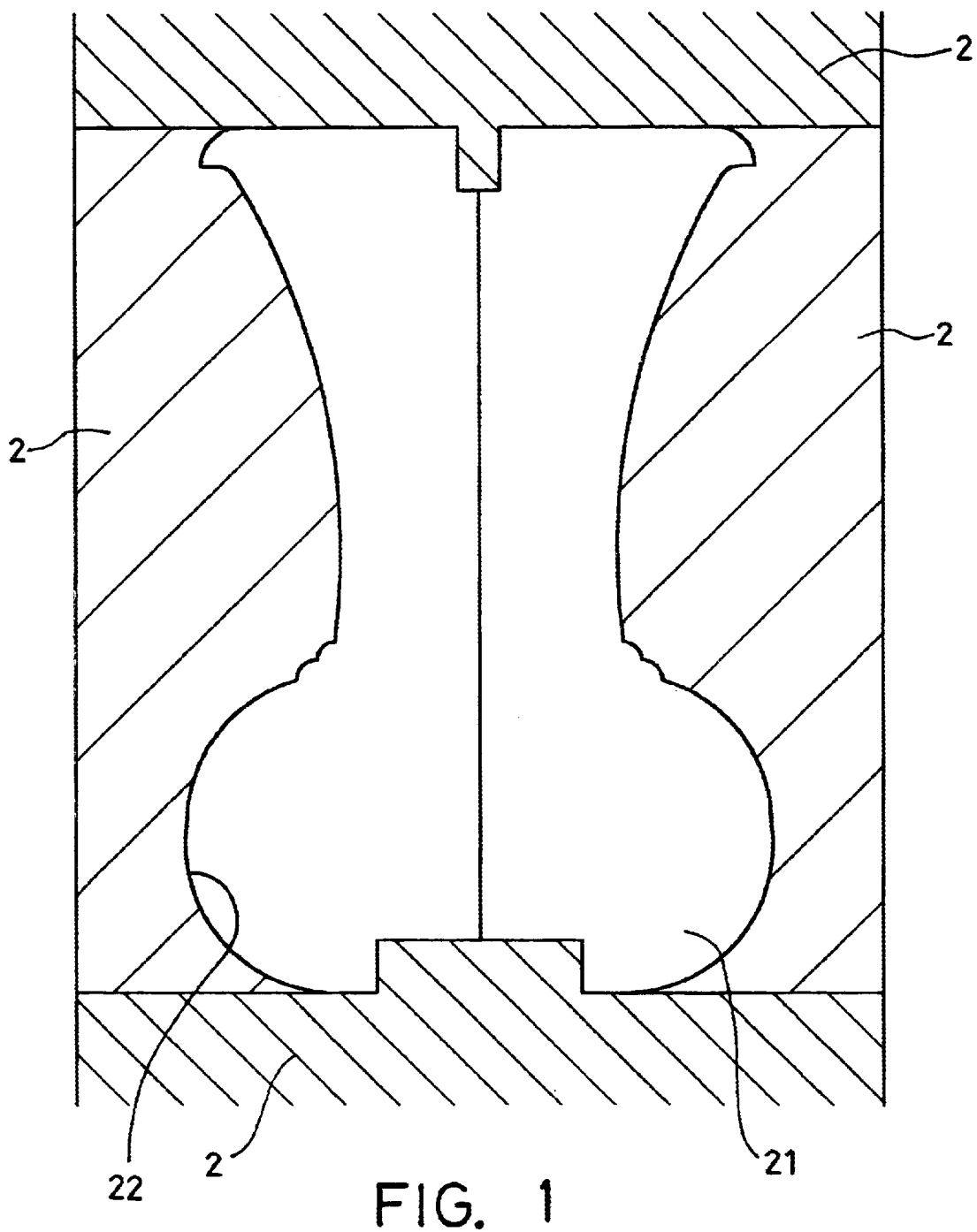
FIG. 1 is a cross section view of a molding tool for making a hollow artificial stone according to the present invention.
Figure 2:
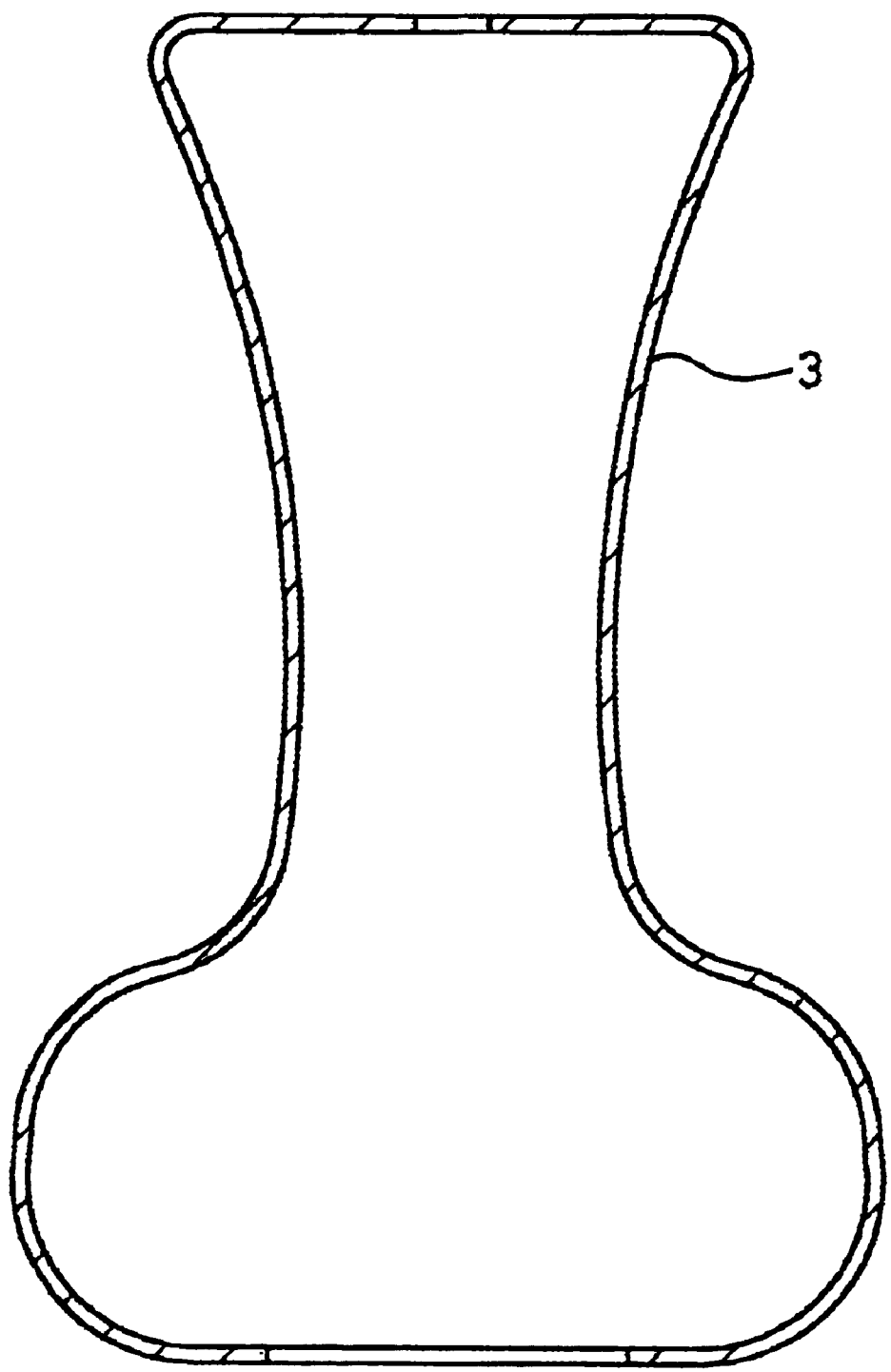
FIG. 2 is a cross section view of a bush blank utilized during making a hollow artificial stone structure according to the present invention.
Figure 3:
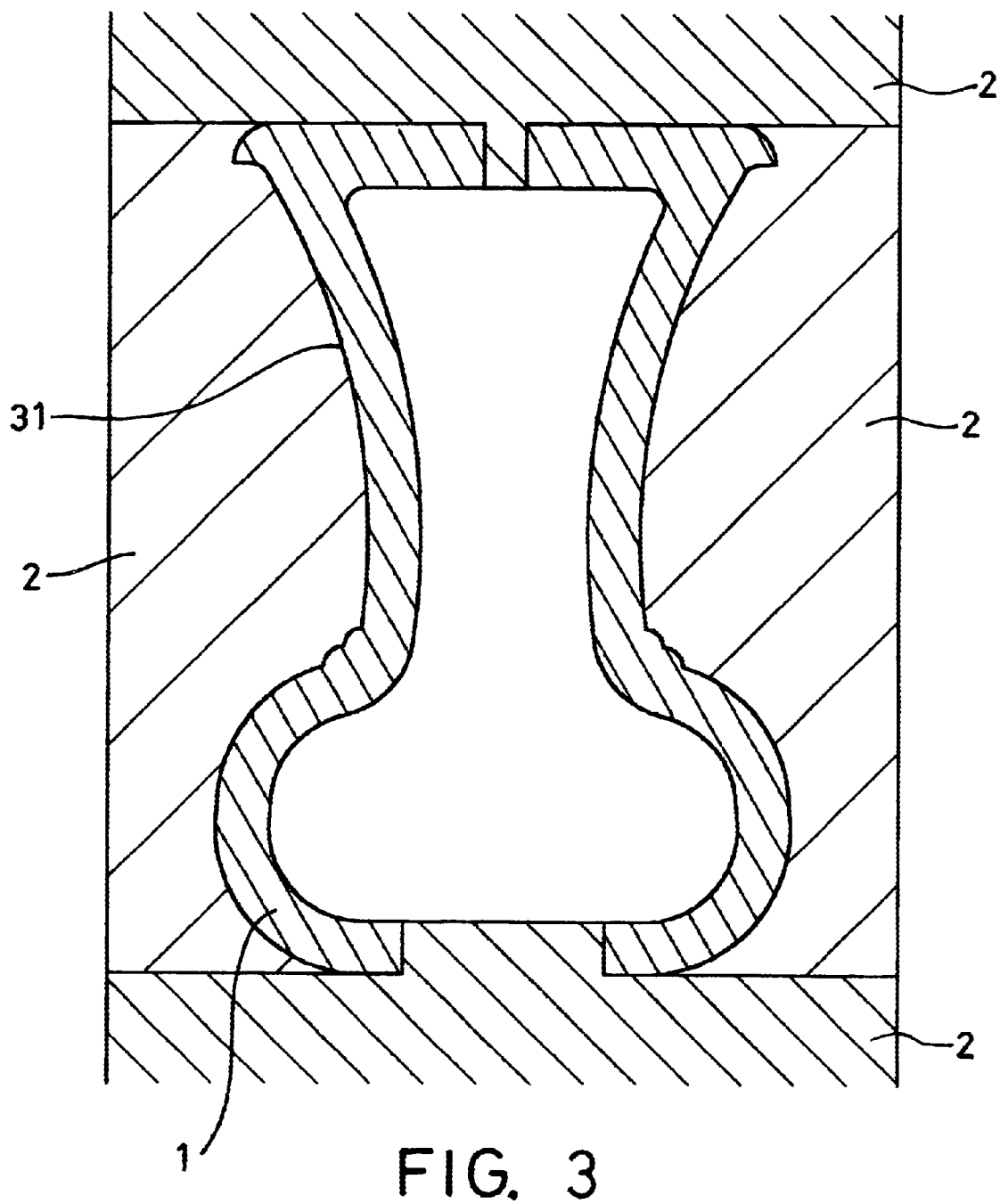
FIG. 3 is a sectional view of hollow artificial stone structure according to the present invention during a step of squeezing.
Figure 4:
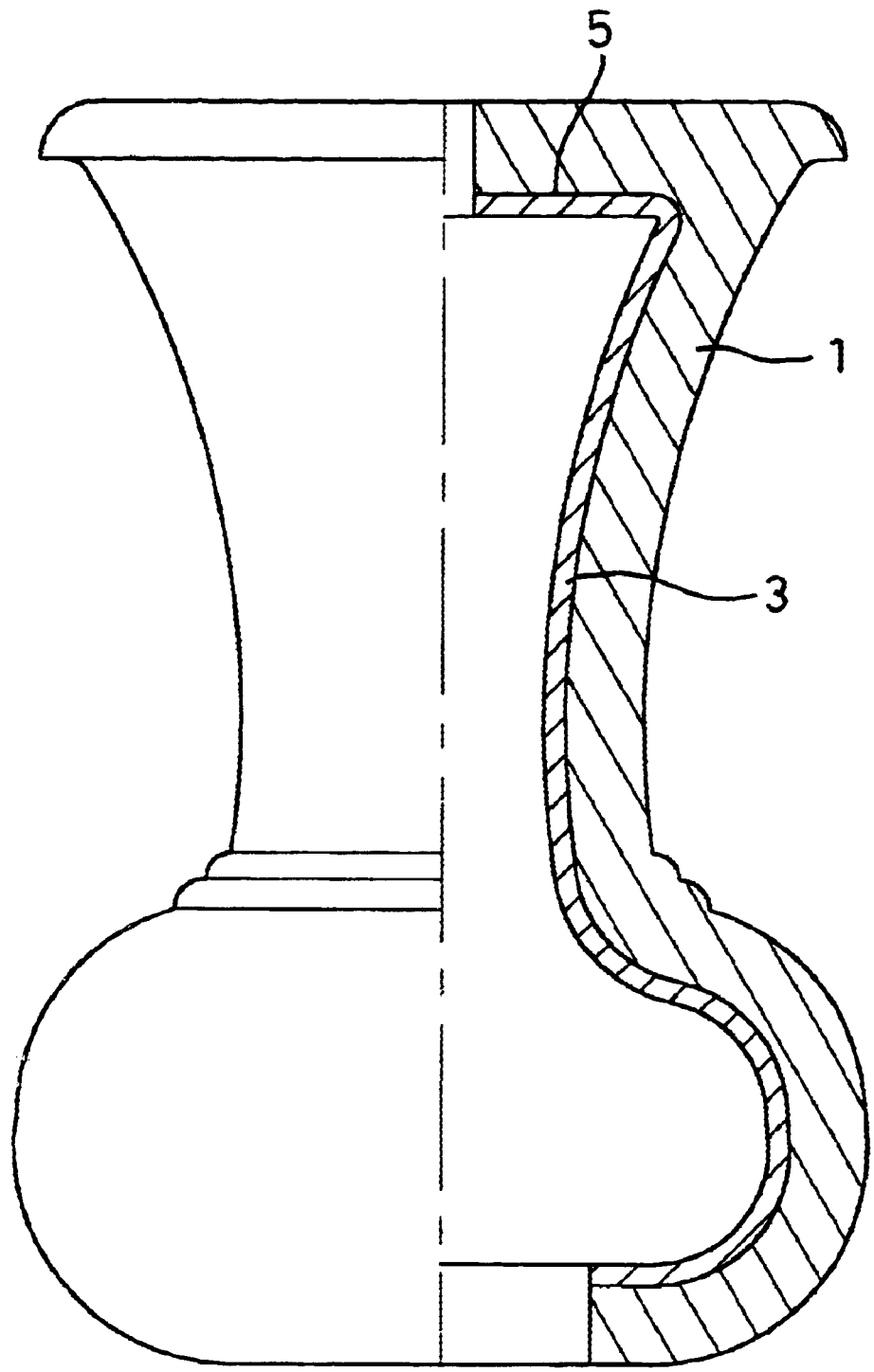
FIG. 4 is a semi-sectional view of a finished hollow artificial stone structure according to the present invention.
Figure 5:
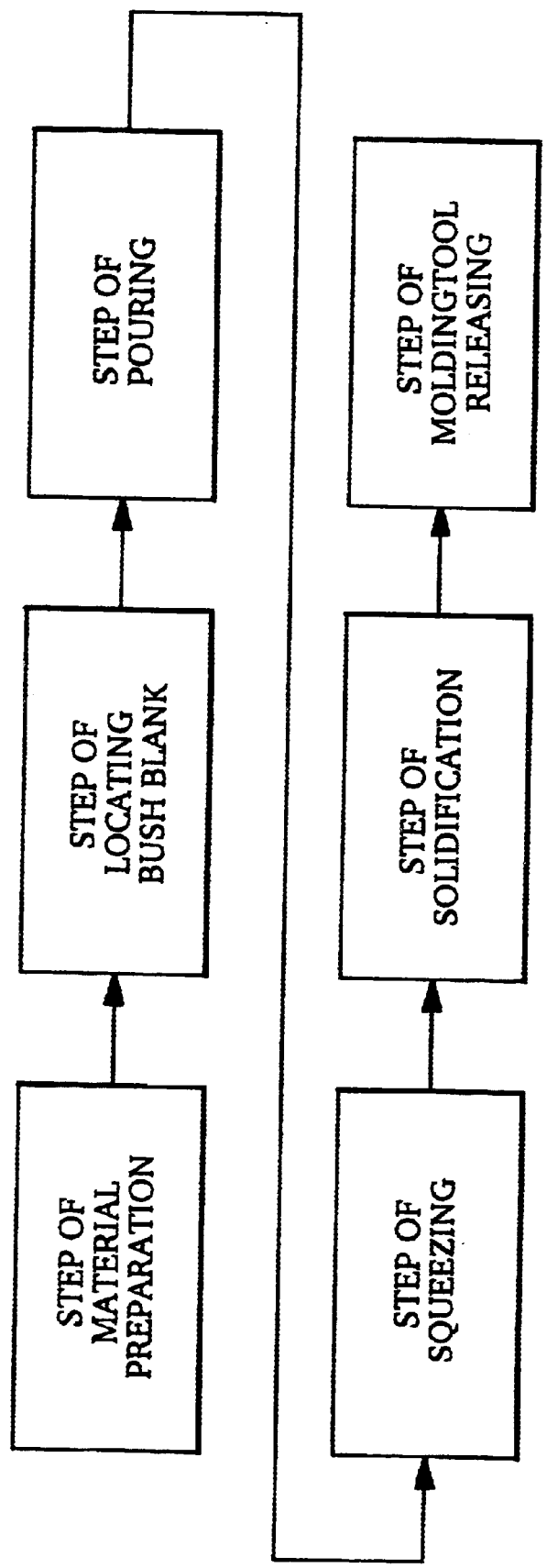
FIG. 5 is a flow chart illustrating steps of fabrication for a hollow artificial stone structure according to the present invention.

Referring to FIGS. 1 to 5, a method for fabricating a hollow artificial stone structure of the present invention basically comprises the following steps: a step of material preparation A, a step of locating a hollow blank B, a step of pouring C, a step of squeezing D, a step of solidification E, and a step of mold releasing F.

Wherein, the step of material preparation of A is to mix the stone powder and adhesive together as a mixed material. The mixed material, which contains 20–80% weight of stone powder and rest percentage of adhesive, is agitated evenly to form glue like mixed material 1 with fluidity. The adhesive preferably is transparent epoxy resin, but not required. The grain size of stone powder preferably is not greater than 100 meshes.

Next, a outer forming mold 2 is prepared to have a two-piece enclosure so as to provide a mold room 21. An inner wall 22 of the outer forming mold 2 is the part to constitute the contour of finish product after forming. It is preferable that the outer forming mold 2 is made of fiber reinforced plastic (FRP), but not required.

Meanwhile, a hollow blank 3 is provided in the outer forming mold 2 in order to constitute a finish hollow work piece. The hollow blank 3 is hollow and is formed of high molecular material such as mold blowing of PET. The contour of hollow blank 3 provides a size smaller than the inner wall 22 of outer forming mold 2 with a shape thereof corresponding to the inner wall 22 of outer forming mold 2. Thus, a clearance 31 is left between the hollow blank 3 and inner wall 22 as a passage for the mixed material 1.

The step of locating hollow blank B is to place the hollow blank 3 into the outer forming mold 2 such that the clearance 31 is formed for filling with the mixed material 1.

The step of pouring C is to pour the preceding mixture material 1 downward from the top of outer mold 2 into the clearance 31 so as to fill the clearance 31 with the mixture to obtain the desired thickness of hollow artificial stone. In the meantime, the mixed material 1 can be associated with the hollow blank 3.

The step of squeezing D is to press a proper force downward at the upper opening of outer mold 2 so as to allow the mixed material 1 being compressed in the clearance 31 tightly.

The step of solidification E is to solidify the mixed material 1 disposed between the outer mold 2 and the hollow blank 3 so as to form a firm wall of hollow artificial stone.

The step of molding tool releasing F is to separate the outer mold 2 from the finished hollow artificial stone structure. Meanwhile, the hollow blank 3 has formed as the inner wall of the finished hollow artificial stone structure. Finally, the finished hollow artificial stone structure then can be rearranged for further treatment.

Referring to FIGS. 1 to 5 again, the hollow artificial stone made by way of the method of the present invention has a inner wall of the preceding hollow blank 3 and an outer layer thereof of the mixed material 1. Because the mixed material 1 is penetrable for light and as hard as the stone, an appended value thereof can be enhanced substantially while the hollow artificial stone of the present invention is used for making a lamp stand. Even if the hollow artificial stone of the present invention is used for making a post or pillar, the post or pillar can provide the property owned by a real stone either.

It is appreciated from the above description that the advantage of present invention can be summarized in the following:

1). The method provided by the present invention is easily performed. The steps in the method of the present invention are not necessary to utilize any precise machine or equipment so that no huge investment is required.
2) The finished work piece of hollow artificial stone made by the method of the present invention provides the same sense of quality as the natural stone and has a feature of penetrability for light. Comparing to the conventional ceramics, it is possible for the artificial stone structure of the present invention to enhance the value thereof.
3) Because the artificial stone structure of the present invention is hollow with less weight, it is helpful for easily delivering and assembling, which are important for a DIY product.
4) The configuration of hollow artificial stone structure made by the method of the present invention can be changed with variety. Additionally, a consistent quality and size of hollow artificial stone structure can be made by the method of the present invention and it is helpful for mass production.

While the invention has been described with reference to preferred embodiments thereof, it is to be understood that modifications or variations may be easily made without departing from the spirit of this invention, which is defined by the appended claims.

What is claimed is:

1. A hollow artificial stone structure, comprising:
   a hollow body with an inner wall, the hollow body being made of a mixed material composed of 20–80% by weight of stone powder and the remainder an adhesive; and
   a hollow blank, the hollow blank is adjoined to the inner wall and located within the hollow body.
2. The hollow artificial stone structure according to claim 1, wherein the adhesive is an epoxy resin.
3. The hollow artificial stone structure according to claim 2, wherein the epoxy resin is transparent.
4. The hollow artificial stone structure according to claim 1, wherein the stone powder has a grain size of not greater than 100 mesh.

* * * * *